United States Patent [19]

Losier

[11] Patent Number: 5,290,741
[45] Date of Patent: Mar. 1, 1994

[54] METHODS OF PRESERVING, STORING, AND USING HYDROXYLAMINE PRODUCTION CATALYST

[75] Inventor: Thomas P. Losier, Lake Jackson, Tex.

[73] Assignee: BASF Corporation, Parsippany, N.J.

[21] Appl. No.: 581,168

[22] Filed: Sep. 4, 1990

Related U.S. Application Data

[63] Continuation of Ser. No. 423,318, Oct. 18, 1989, abandoned.

[51] Int. Cl.$^5$ ............................................. B01J 20/20
[52] U.S. Cl. ....................................... 502/20; 502/185; 502/339; 423/387
[58] Field of Search .................... 502/20, 339, 185; 423/387

[56] References Cited

U.S. PATENT DOCUMENTS

| | | | |
|---|---|---|---|
| 3,060,133 | 10/1962 | Jockers et al. | 502/339 |
| 3,956,469 | 5/1976 | El-Ghatta et al. | 502/339 |
| 4,028,274 | 6/1977 | Kunz | 502/185 |
| 4,115,523 | 9/1978 | Ratcliffe | 423/230 |
| 4,122,040 | 10/1978 | McCarroll et al. | 502/185 |
| 4,863,894 | 9/1989 | Chinchen et al. | 502/343 |
| 4,889,704 | 12/1989 | Fuchs et al. | 423/387 |
| 4,895,711 | 1/1990 | Biffar et al. | 423/387 |

*Primary Examiner*—Anthony McFarlane
*Attorney, Agent, or Firm*—Karen M. Dellerman

[57] ABSTRACT

This invention relates to methods of preserving, storing, and using hydroxylamine production catalyst and, more particularly, to methods of preparing, storing, and using such catalyst in substantially oxygen free environments.

14 Claims, No Drawings

METHODS OF PRESERVING, STORING, AND USING HYDROXYLAMINE PRODUCTION CATALYST

This is a continuation of copending application(s) Ser. No. 07/423,318, filed on Oct. 18, 1989, now abandoned.

1. FIELD OF THE INVENTION

This invention relates to methods of preserving, storing, and using hydroxylamine production catalyst and, more particularly, to methods of preparing, storing, and using such catalyst in substantially oxygen free environments.

2. DESCRIPTION OF RELATED ART

The production of hydroxylamine is accomplished utilizing a catalyst consisting of platinum supported on a carbon carrier which is preferably graphite. The catalyst is prepared by precipitating or impregnating platinum onto the support using methods which are well known to those skilled in the art. Such methods are disclosed in U.S. Pat. Nos. 4,028,274; 4,122,040, and 3,060,133, the disclosures of which are hereby incorporated by reference.

In the operation of a hydroxylamine production facility, the addition of freshly regenerated catalysts to hydroxylamine reaction trains of the production facility results in an increase in catalyst activity. However, such addition of freshly regenerated catalysts also has associated with it a temporary decrease in the selectivity of the reaction towards hydroxylamine. In order to minimize the negative effects of the catalysts' addition on selectivity, and maximize the positive effects on activity, catalysts' addition has heretofore been limited to small amounts of the regenerated catalyst. Rapid addition of regenerated catalysts causes unacceptable selectivities. Further, the selectivity of regenerated catalysts can be adversely affected by post-regeneration handling techniques.

It has been unexpectedly discovered that the instant invention allows for large amounts of catalysts to be added to hydroxylamine reaction trains without adversely affecting the catalysts selectivity. Further, the instant invention allows for entire reaction trains to be emptied and replaced with regenerated catalysts and such trains have experienced unexpected and surprising increases in hydroxylamine production rates.

SUMMARY OF THE INVENTION

This invention pertains to methods of inhibiting the diminution of a selectivity of a hydroxylamine catalyst during the preservation, storage, and use of such catalyst by maintaining the catalyst during such preservation, storage, or use in a substantially oxygen-free environment. The substantially oxygen-free environment may take the form of deionized and deoxygenated water, nitrogen, hydrogen, argon, or similar non-oxygen containing media or environment.

Objects, features, and advantages of this invention are to provide methods of preserving, regeneration, storing, and using hydroxylamine catalysts without adversely affecting the selectivity of the catalyst; preparing a hydroxylamine catalyst to obtain a predetermined selectivity and which increases reaction rates; controlling the reaction selectivity of the catalyst and avoiding large swings in selectivity associated with prior methods of preserving, storing, and using the catalyst; and rapidly charging large amounts of hydroxylamine catalysts to reactor cascades without adversely affecting selectivities and providing an increase in reaction rates.

These and other objects, features, and advantages of this invention will be apparent from the following detailed description and appended claims.

DETAILED DESCRIPTION OF THE INVENTION

The selectivity of regenerated catalysts can be adversely affected by post-regeneration handling techniques. It has been unexpectedly discovered that exposing freshly generated catalysts to air can cause both the selectivity of the reaction (percent hydroxylamine produced) and the production rate of hydroxylamine to significantly decrease in a relatively short period of time. It is believed that this phenomenon may be irreversible. Regenerated catalyst in production plants is often exposed to air when it is filtered, handled, and transferred to the reactors. Evaluation of these production samples indicates that significant damage can occur to catalyst which is exposed to oxygen prior to its addition to reactor trains.

The original selectivity of the catalyst can be preserved if the catalyst is kept in a substantially oxygen-free environment. It is believed that oxygen reacts readily with hydroxylamine catalysts to create a system that favors the synthesis of two undesirable products, ammonium sulfate and nitrous oxide. Regenerated catalyst can be preserved by keeping it in a substantially oxygen-free environment. Suitable substantially oxygen-free environments may take the form of deionized and deoxygenated water, nitrogen, hydrogen, argon, or similar non-oxygen containing media or environment. Preferably, the catalysts may be preserved or stored in a sealed vessel under deionized and deoxygenated water with a nitrogen purge. Nitrogen bubbling with mild agitation of the deionized and deoxygenated water is preferable.

Laboratory experiments were conducted to determine the change in specificity towards hydroxylamine associated with the use of regenerated catalysts which were exposed to oxygen. Several batches of freshly regenerated catalysts were prepared from which samples were taken prior to filtration of the catalyst. The samples were immediately washed, filtered, and split into 50 gram (weight basis) subsamples. The handling of the samples was extremely critical, in that exposure to air was minimized. These "preserved" samples were quickly evaluated in a laboratory reactor. The remaining samples were used in subsequent catalyst handling studies which includes exposure of a sample to various gases which are illustrated in Table I.

Normal filtered samples of the same catalyst batches were also taken. These samples were also immediately split and evaluated in a laboratory reactor.

The results of the laboratory reactor experiments performed on the "preserved" samples and the normal flatbed samples are summarized in Table I. The data indicates that hydroxylamine production is significantly higher for the "preserved" catalyst. Conversely, the ammonium sulfate production is significantly lower for the "preserved" catalyst. Therefore, the specificity of the reaction towards hydroxylamine is favored by the "preserved" catalyst. Although the consumption of free acid is higher for the normal samples which have been exposed to oxygen, it is apparent that the normal catalyst produced more ammonium sulfate and nitrous oxide. The values presented in Table I were calculated on the basis of data obtained during the first two hours of experiments. The two-hour time interval was selected as a benchmark, since the activity of the catalyst is essentially linear during this period. The data indicates that the purging of the "preserved" catalyst samples in deionized and deoxygenated water with either hydrogen or nitrogen is an effective preservation technique.

TABLE I

Hydroxylamine Mini-Kettle Experiments

| Run No. | Sample Description | HA S-T-Y (g/l/h) | AS S-T-Y (g/l/h) | Acid Consumption (N/h) | Spec. % | $N_2O$ (%) |
|---|---|---|---|---|---|---|
| 1 | Normal Filter | 12.9 | 47.5 | 1.30 | 35 | 9.2 |
| 2 | Normal Filter | 15.5 | 39.6 | 1.21 | 43 | 10.6 |
| 3 | Preserved | 25.9 | 4.25 | 0.97 | 92 | 4.0 |
| 4 | Preserved | 24.8 | 6.60 | 0.98 | 88 | 4.0 |
| 5 | Preserved | 30.4 | 10.9 | 1.20 | 85 | 4.8 |
| 6 | Preserved | 32.5 | 7.6 | 1.20 | 90 | 2.9 |
| 7 | Preserved | 18.0 | 2.60 | 0.62 | 93 | 4.1 |
| 8 | Preserved (Purged w/$H_2$ in DI, 2 days) | 27.2 | 17.2 | 1.25 | 76 | 6.0 |
| 9 | Preserved (Purged w/$N_2$ in DI, 2 days) | 25.6 | 27.7 | 1.33 | 65 | 8.1 |
| 10 | Preserved (Purged w/air in DI, 2 days) | 10.3 | 31.4 | 0.89 | 39 | 14.9 |
| 11 | Preserved (Purged w/air in DI, 3 days) | 19.0 | 29.7 | 1.18 | 56 | 7.0 |
| 12 | Preserved (Purged w/$N_2$ in DI, 3 days) | 33.5 | 6.6 | 1.13 | 91 | 5.2 |
| 13 | Preserved (Purged w/$H_2$ in DI, 4 days) | 31.4 | 7.3 | 1.14 | 90 | 6.8 |

Catalyst loading: 30 g/l; Temperature: 40° C.; Pressure: 1.6 atm.
Calculated data based on values observed for first two hours,
HA: Hydroxylamine
AS: Ammonium sulfate
S-T-Y: Space-Time-Yield
Spec. = (HA/(HA + AS)) * 100
DI: deionized water As can be seen from Table I, allowing hydroxylamine catalysts to be exposed to air severely reduces the selectivity of the catalyst towards hydroxylamine.

Likewise, when the method of storing the catalyst involves exposure to air, i.e., storing in deionized and deoxygenated water but purged with air, the selectivity of the catalyst is adversely affected. Conversely, hydroxylamine catalysts preserved in a substantially oxygen-free environment such as deionized and deoxygenated water, nitrogen, or hydrogen produce a surprising and unexpected selectivity of the catalyst towards hydroxylamine.

Previously, rapid addition of regenerated catalyst to reaction trains caused unacceptable selectivities. Following the instant invention of preserving the catalyst in a substantially oxygen-free environment, entire reactor cascades may be emptied and replaced with such preserved catalysts to achieve unexpectedly high production rates.

The embodiments of the invention in which an exclusive privilege or property is claimed are defined as follows:

What is claimed is:

1. A method of inhibiting the diminution of the selectivity of a carbon supported platinum catalyst for producing hydroxylamine after manufacture or regeneration of said catalyst which comprises continuously maintaining said catalyst during preservation and storage in a substantially oxygen-free environment.

2. A method as set forth in claim 1 wherein said environment comprises deionized and deoxygenated water.

3. A method as set forth in claim 1 wherein said environment comprises nitrogen.

4. A method as set forth in claim 1 wherein said environment comprises hydrogen.

5. A method of inhibiting the diminution of the selectivity during storage of a carbon supported platinum catalyst for producing hydroxylamine which comprises continuously maintaining said catalyst in a substantially oxygen-free environment.

6. A method as set forth in claim 5 wherein said environment comprises deionized and deoxygenated water.

7. A method as set forth in claim 6 further comprising providing a nitrogen blanket on said water.

8. A method as set forth in claim 6 further comprising bubbling nitrogen through said water.

9. A method as set forth in claim 5 wherein said environment comprises hydrogen.

10. A method as set forth in claim 5 wherein said environment comprises nitrogen.

11. A method as set forth in claim 5 wherein said step of maintaining is under a blanket of deionized and deoxygenated water in a housing which is non-reactive with said catalyst.

12. A method as set forth in claim 11 wherein said housing is glass lined.

13. A method as set forth in claim 11 wherein said housing is sealed and a nitrogen purge is maintained thereon.

14. A method as set forth in claim 11 further comprising bubbling nitrogen through said water.

* * * * *